United States Patent
Won et al.

(10) Patent No.: US 6,214,189 B1
(45) Date of Patent: Apr. 10, 2001

(54) METHOD FOR ELECTRO-KINETICALLY DECONTAMINATING SOIL CONTAINED IN A RADIOACTIVE WASTE DRUM, AND APPARATUS THEREFOR

(75) Inventors: Hui-Jun Won; Byung-Gil Ahn; Gye-Nam Kim, all of Daejeon-Si; Hoy-Sam Kwon, Chungju-Si; Chul-Yong Lee, Daejeon-Si; Chong-Hun Jung, Daejeon-Si; Byung-Jik Lee, Daejeon-Si; Won-Zin Oh, Daejeon-Si, all of (KR)

(73) Assignees: Korea Atomic Energy Research Institute, Daejeon-Si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/236,230

(22) Filed: Jan. 22, 1999

(30) Foreign Application Priority Data

Dec. 17, 1998 (KR) .................................. 98-55928

(51) Int. Cl.⁷ ..................................... B01D 61/56
(52) U.S. Cl. .......................... 204/515; 204/600; 205/687; 205/742; 588/204
(58) Field of Search ................... 204/515, 600; 205/687, 742; 588/204

(56) References Cited

U.S. PATENT DOCUMENTS 5,415,744 * 5/1995 Jacobs ................... 204/515
5,846,393 * 12/1998 Clarke et al. ............ 204/515

* cited by examiner

Primary Examiner—Arun Phasge
(74) Attorney, Agent, or Firm—Arent Fox Kinter Plotkin & Kahn PLLC.

(57) ABSTRACT

A method and an apparatus for electrokinetically decontaminating the soil contained in a radioactive waste drum are disclosed. The radioactively contaminated soil is put into drums, and the drums are carried to a temporary storage or to a disposal site. If the extremely low level radioactive soil is decontaminated rather than carrying the soil to the temporary storage or to a disposal site, and if the decontaminated soil is returned to the nature, then the limited storage capacity can be saved. Further, if a high level radioactive soil is treated to a low level one, and if thus a low level radioactive soil is stored in a storage, then the safety is improved. In the present invention, electrodes are buried into the contaminated soil contained in a radioactive waste drum, and a dc current is supplied, so that the radioactive nuclide and impurities can be removed by the electroosmosis and the electromigration. The anode includes: (1) at least 3 or more metal tubes made of titanium or zircaloy and having a diameter of 5 cm or less; (2) at least 6 or more metal rods made of stainless steel, titanium, or zircaloy; and (3) stainless steel sieves. The cathode is a tube made of carbon steel, stainless steel, or palladium, and has a diameter of 10 cm or less.

9 Claims, 3 Drawing Sheets

METHOD FOR ELECTRO-KINETICALLY DECONTAMINATING SOIL CONTAINED IN A RADIOACTIVE WASTE DRUM, AND APPARATUS THEREFOR

BACKGROUND OF THE INVENTION

1. Field of the Invention

The present invention relates to a method and an apparatus for electro-kinetically decontaminating the soil contained in a radioactive waste drum.

2. Description of the Prior Art

Patent applications for the technique similar to the present invention have been filed since 1989, and the last patent was issued in 1998 under U.S. Pat. No. 5,725,752.

Between 1981 and 1985 in the United States, there were developed a method for extracting water from a sludge by using a dynamic electric current, a method for drying wet soil, and a method for adjusting the water flow amount or for reversing the water flow direction. Patents were issued for these techniques (U.S. Pat. Nos. 4,305,800, 4,382,341, and 4,479,857). Between 1976 and 1993 in Japan, a method for extracting water from soil was developed, and patents were issued (02136435 JP A1). Besides the environmental industries, the Hewlett-Packard company utilized the electroosmosis to develop an ink distribution unit for the ink jet printer. Patent applications for this technique were filed in the U. S. and Japan.

To describe the patents related to the present invention, R. F. Probstein et al. filed a patent application in 1989, and obtained a patent in 1991 (U.S. Pat. No. 5,074,986). The technique was on decontaminating the soil site, and the title of the invention was "Electroosmosis Techniques for Removing Materials from Soil". The main claim was on electrically decontaminating the contaminated soil site, and the related claims were on the voltage gradients, on the electrodes, and on the purging liquid supply method.

Almost simultaneously with R. F. Probstein et al., Y. B. Acar et al. obtained a patent (U.S. Pat. No. 5,137,608) under the title of "Electrochemical Decontamination of Soils or Slurries". The total number of claims were 33, and the technique was on an inert anode (containing graphite) and a non-reactive cathode (containing graphite). The object to be decontaminated is metals (such as Pb ions), organic materials, and radioactive nuclides. The Pb ions are recovered at the cathode. The main electrochemical process within the soil includes the steps of: (1) transmitting direct electric current through the soil between an inert anode and non-reactive cathode; (2) supplying a first liquid which comprises water to the soil near said anode; and (3) introducing a nutrient into the soil thorough electroosmosis.

J. P. Bibler obtained in 1993 a patent under the title of "Method and Apparatus for Removing Ions from Soil" (U.S. Pat. 5,190,628). The technique is on selectively removing ions from the soil. That is, a permeable membranes impregnated with an ion exchange resin that is specific to one or more species of chemical ions are inserted into ground. Then electrodes are installed near the membrane, and a voltage is supplied to them. Preferably, the resin exchanges ions of sodium or hydrogen for ions of metal that it captures from soil area. When the permeable membrane is saturated with the metal ions, the potential applied across electrodes is discontinued and membranes are preferably removed from soil for storage or recovery of the ions. The claims state the following matters. That is, there is provided a method for removing one or more species of ions from an area of soil groundwater. That is, (1) placing at least two electrodes in spaced relation with respect to each other and to said area of soil; (2) placing a permeable barrier adjacent each of said at least two electrodes and said area of soil, said barrier adapted to pass said groundwater, said barrier carrying an ion exchange resin, said resin being selective for said at least one species of ions; and (3) applying a potential across said electrodes, said potential causing said at least one species of ions to migrate with respect to said electrodes, thereby allowing said ion exchange resin carried in said permeable barrier to capture said species. The main species removed is assumed to be a mercury ion, and at least two titanium electrodes are installed. The first and second membranes are spaced approximately 10 feet apart and said electric potential is approximately 60 volts DC.

H. R. Chang et al. obtained a patent in 1993 under the title of "Surfactant Augmented In-situ Removal of Poly-chlorobenzenes from Soil by Electroosmosis" (U.S. Pat. No. 5,240,570). In this method, the contaminants such as poly-chloro-benzenes are electro-osmotically extracted from soil at the contamination site. By adding a low concentration surfactant solution, the decontamination capability is reinforced.

R. A. Jacobs obtained a patent in 1995 under the title of "Removal of Contaminant Material from a Soil Site" (U.S. Pat. No. 5,415,744). In this method, at least one anode is positioned in the soil site, and a plurality of cathodes are disposed around the anode. Then a voltage gradient is established between the anode and the cathodes. Owing to the electroosmosis, the solution at the anode moves to the cathodes. That is, the contaminant materials are moved together with the solution, and are removed at the cathodes. The total number of the claims was 19, and the method includes the steps of: (1) positioning one anode at a first location within said soil site; (2) positioning a plurality of only cathodes at second locations around said anode; (3) establishing voltage gradients between said anode and the said plurality of cathodes; (4) supplying a non-contaminated solution to the anode so as to make the solution and the contamination substances move toward the cathodes; and (5) removing said material from said cathodes. Here, the number of the cathodes should be at least three, and the cathodes should be disposed symmetrically relative to the anode. The cathodes are disposed in a circular form. At the step 5, the solution together with the contamination substances can be removed through separate paths for the respective cathodes, or can be combinedly removed.

W. Pool of Netherlands obtained a patent in 1995 under the title of "Process for the Electroreclamation of Soil Material" (U.S. Pat. No. 5,433,829). The content of this invention is similar to the other ones, but is characterized in that: (1) one or more anodes and one or more cathodes are used, and different levels of voltages are applied between different electrodes; and (2) the contaminants are removed both at the anode and at the cathode unlike the other inventions. The total number of claims was 11. Claim 1 defines as follows. That is, an anode and a cathode are installed within a soil which is contaminated with heavy metals and cyanides. Then an electric current is made to flow between the electrodes so that the contaminants would be gathered to the electrodes. Specifically, claim 1 includes the steps of: (1) inserting an electrode into a porous container to make the electrode serve as an anode (or a cathode) so as to make an electric current flow between this electrodes and another electrode (cathode or anode); (2) installing the electrode into the soil; (3) injecting an electrolytic solution into the electrodes through a cathode circulation system and through an anode circulation system; (4) supplying a dc current to the electrodes to make the contamination substances move to the electrodes (electro-migration); and (5) removing the contamination substances from the anode and the cathode.

Further, continuous adjustments are carried out on the pH level of the circulation system, the electrical conductivity, temperature and current density within the solution. Other claims contain the following contents. That is, an acid is added to adjust the acidity of the solution so as to improve the decontamination effect. The anode is made of a noble metal, and the cathode is made of graphite. The heavy metals to be removed are ions of Cu, Pb, Zn, Ni, Co, Fe, Sr, Mg and Ca. In this method, the migration of the contaminants can also be prevented by the application of electrical method.

R. J. Griffith et al. obtained a patent in 1996 under the title of "Electric Field Method And Apparatus for decontaminating Soil" (U.S. Pat. No. 5,584,980). The subject matter of this invention is as follows. That is, an in-situ decontamination is carried out by using a plurality of adjacent electrodes. This invention offers a low cost decontamination. The total number of claims is 33, and claim 1 includes the steps of: (1) arranging a plurality of small adjacent electrodes in one rows into the soil to form a planar anode; (2) arranging a plurality of small adjacent electrodes in one row into the soil to form a planar cathode; (3) making the distance between the electrodes within one row become 50% as large as the distance between the rows; (4) supplying voltages to the anodes; (5) directing a first fluid containing an additive to the anode assemblies to make the solution move to the cathode based on the electroosmosis; (6) making the remaining solution flow faster than the electroosmotic flow so as to recover it.

In claim 2, a second solution having an additive is injected to the cathode, and the solution coming from the anode is recovered. Besides, the claims contain the following contents. That is, the waste solution is treated to reuse it. The method is applied to the region of soil. The anodes are arranged alternately with the cathodes. A permeable geomembrane is used. Two cylindrical electrodes are coaxially used, so that a solution channel can be formed.

J. G. Sunderland et al. of England obtained patents in 1998 under the title of "Electrokinetic Decontamination of Land" (U.S. Pat. No. 5,725,752, and EP 0 724 492 B1). The subject matter of this invention is as follows. That is, the soil is decontaminated by applying a DC electric field across electrodes. At least one anode and at least one cathode are installed in or on said soil, and then, a dc electric current is supplied. Here, a typical anode assembly for use in the method of the invention comprises the carbon felt anode material wrapped around a suitable current feeder and one or more electrolyte feed means. And, the cathode assembly for use in accordance with the method of the invention comprises a cathode, which may be, for example of stainless steel or alternatively a carbon felt material like the anode, within a porous housing, the housing allowing the passage of electrolyte therethrough. This is an in-situ decontamination method using an electrode group, and its cost is very low. The total number of claims is 16, and claim 1 is characterized as follows. That is, at least one anode is installed within the soil, and a DC current is supplied to it, so that oxygen would be produced. The anode is wrapped with a carbon fiber, and the carbon fiber directly contacts with the soil. In claim 2, a cathode is disposed within a porous housing through which the electrolyte can pass. The porous cathode housing is made of a ceramic material, a microporous polymer material or a dense cloth. -The anode is made of carbon, active carbon, or carbon fiber. When a DC current is supplied to it, a colloidal carbon is formed, and moves together with the water owing to the electric field. An electrolyte is supplied through tiny channels which are formed within the carbon anode layer. The cathode is made of stainless steel, nickel, carbon felt and titanium suboxide. The additive for improving the decontamination efficiency is composed of water soluble electrolytes, non-ionic surfactants, cationic surfactants, complexing agents, polyelectrolyte leachants, inorganic acids and organic acids. Between the anode and the cathode, there is at least one bore hole. And, at least one bore hole is positioned outside of an area between the cathode and the electrode.

Yamazaki Teruhiko and Katsura Tsutomu filed patent applications respectively in 1991 and 1993 (19910831 JP 03-244356, and 19930206 JP 05-42197). The titles were "Method for Disposing Polluted Soil, And Its Equipment" and "Method And Device for Treating Water-containing Soil On Site by Electroosmosis".

Orito Shigeru filed a patent application in 1995 (19950411 JP 07-110103), and the title of the invention was "Electrochemical Treatment". In this invention, without using a complicated apparatus, a contaminated soil or sludge is separated and treated. That is, the contaminated soil or sludge is put into between an anode and a cathode, and a solution is let to flow on it, while supplying electric current. Then the harmful substances move between the anode and the cathode. These substances are extracted and electrolyzed.

Takagi Kazuhiro at al. filed a patent application in 1995 (19951227 JP 07-341207), and the title of the invention was "Method for Removing Salt from Saline Soil". The subject matter of the invention is as follows. That is, when electroosmotically decontaminating the soil, metal components are deposited on the electrode, and this problem is solved. That is, the deposition of the metals is inhibited by adding a complexing agent into the solution.

Further, it was found that Monsanto Company (St. Louis) filed a patent application (Application No. 95-70601, and Laid-open No. 96-703390) in Korea. This is same as U.S. Pat. No. 5,476,992 (In-Situ Remediation of Contaminated Heterogeneous Soil). It is found that the total number of claims is 3 in a Korean patent, and claim 1 defines that a chemical agent is added to clean a contaminated soil. Claim 2 defines that an electrical method is employed to clean a contaminated soil. Claim 3 defines that a water pressure flow is induced based on the water pressure gradient to clean a contaminated soil. Particularly, in claim 2, a dc current is supplied between a first electrode and a second electrode for the following purposes. (1) An electroosmotic flow is induced from the second electrode to the first electrode, or (2) ionic migration occurs toward the electrode having the opposite charges, or (3) ionic contamination substances are made to migrate from the second electrode to the first electrode by electroosmosis and toward the electrode having the opposite charges by electromigration. Here, (a) The first electrode is disposed at a first edge of the contaminated soil area, and the second electrode is disposed at the opposite edge of the contaminated soil area. (b) Th e first electrode is disposed at an edge of the low transmissive soil area.

SUMMARY OF THE INVENTION

It is an object of the present invention t o provide a method for electrokinetically decontaminating the soil contained in a radioactive waste drum.

The radioactively contaminated soil is put into drums, and the drums are carried to a temporary storage or to a disposal site. If the extremely low level radioactive soil is decontaminated rather than carrying the soil to the temporary storage or to a disposal site, and if the decontaminated soil is returned to the nature, then the limited storage capacity can be saved. Further, if a high level radioactive soil is treated to a low level one, and if thus a low level radioactive soil is stored in a storage, then the safety is improved.

In the present invention, electrodes are buried into the contaminated soil, and a dc current is supplied, so that the radioactive nuclide and impurities can be re moved by the electroosmosis and the electromigration.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
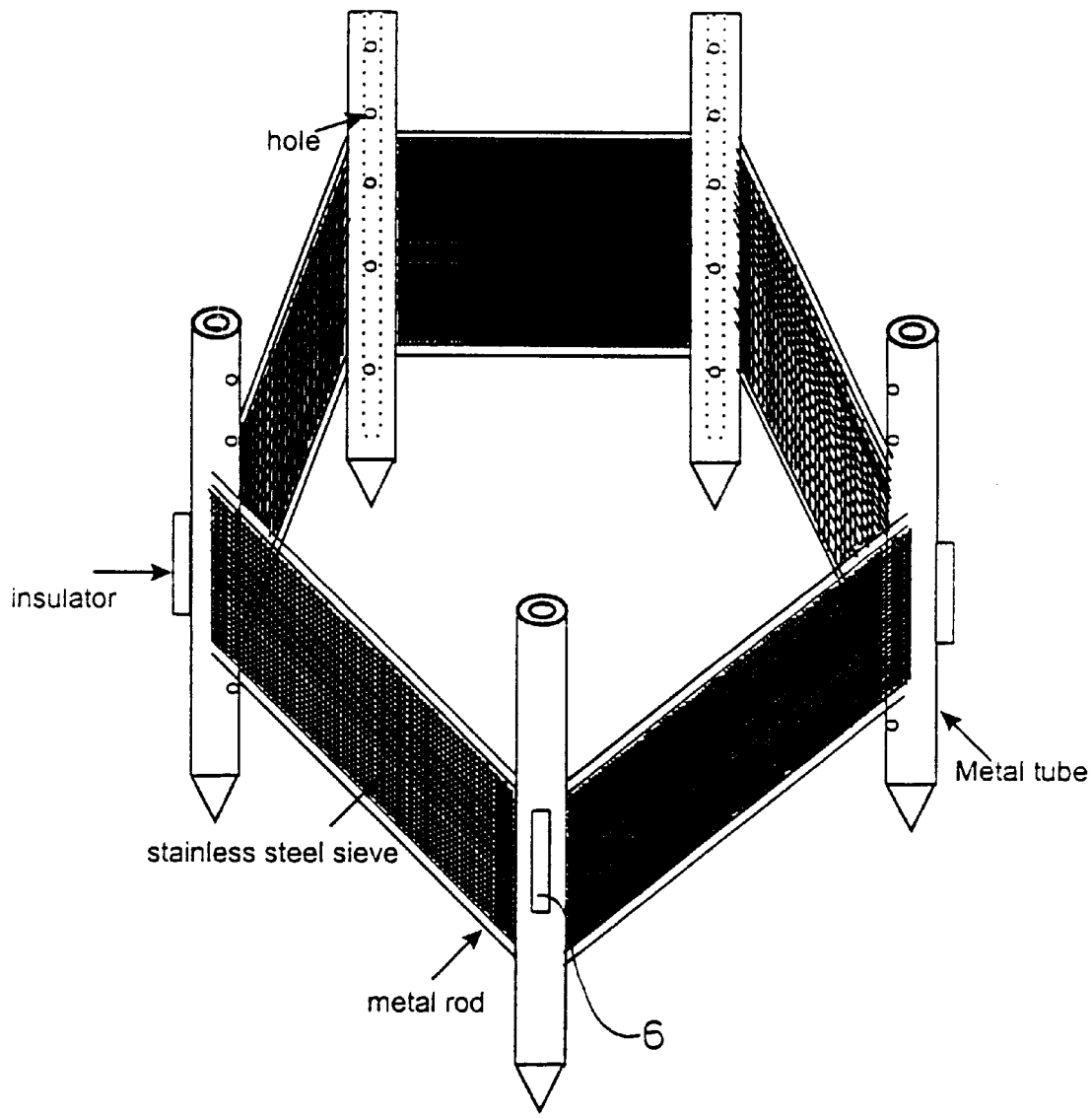
FIG. 1 illustrates the geometric contour of the anode according to the present invention.

FIG. 1 illustrates the geometric contour of the anode according to the present invention. The anode according to the present invention includes: a plurality of metal tubes made of stainless steel, titanium or platinum, with their holes facing toward a cathode; a plurality of connecting metal rods for interconnecting the metal tubes; and a plurality of metal sieves made of stainless steel, for filling the space between the upper and lower metal rods.

Figure 2:
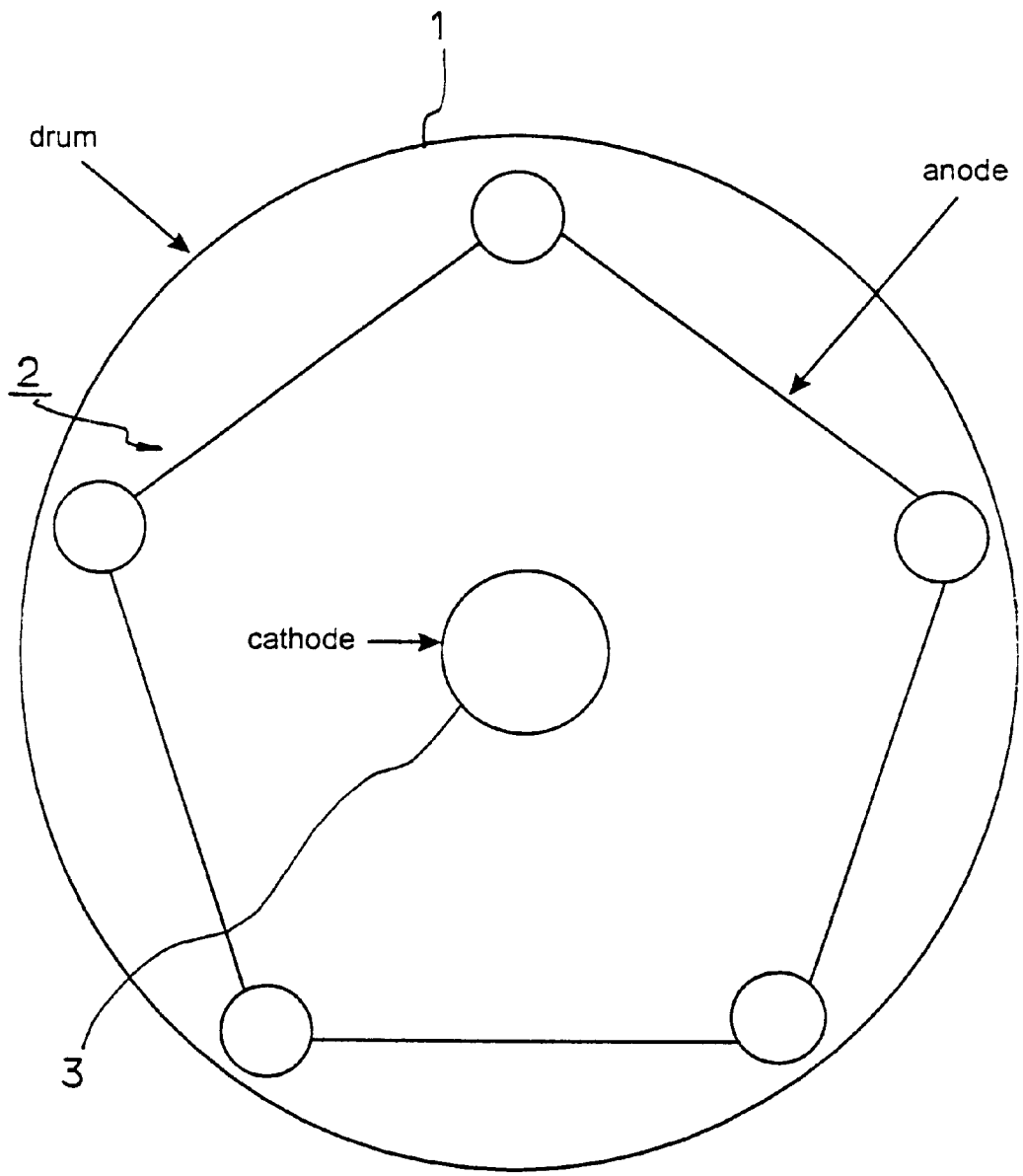
FIG. 2 illustrates the positions of the anode and the cathode of the present invention.

FIG. 2 illustrates the positions of the anode and the cathode of the present invention. The cathode is a conductive tube, and has a plurality of holes. All the anode tubes are connected together, and therefore, a single power source can be used. Further, the holes of the anode are facing toward the cathode, and therefore, if a solution is put into the anode tubes in a state with an electric current conducting therein, the solution flows from the anode to the cathode because of the electroosmotic phenomenon. Unlike the conventional apparatus in which the anode and the cathode are linearly facing, the present invention provides a plurality of anode tubes which face toward a cathode. Therefore, there is little leakage of the solution in the other directions, and the water collecting efficiency is very high.

Figure 3:
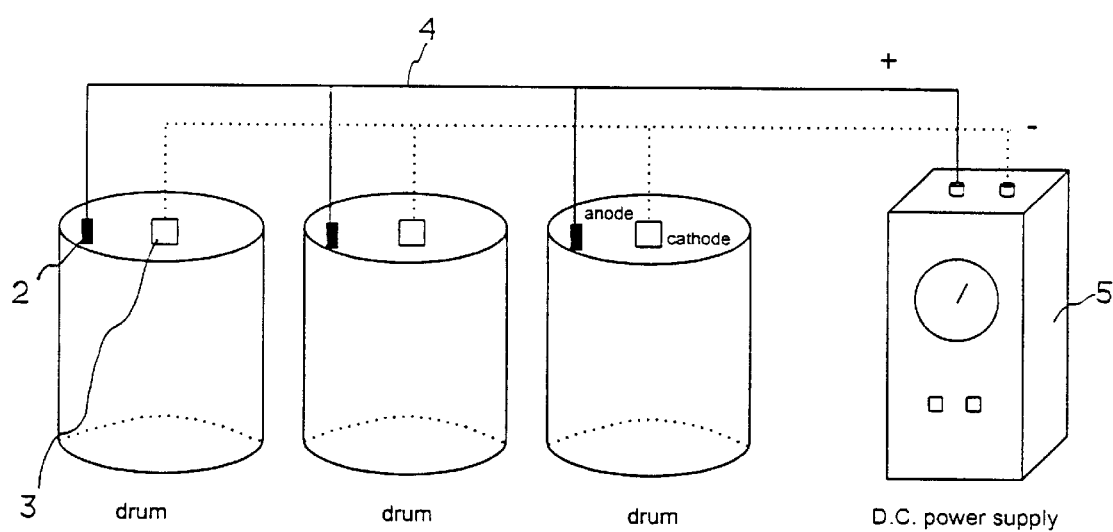
FIG. 3 illustrates the layout of the power source and the drums used in the present invention.

FIG. 3 illustrates the layout of the power source and the drums used in the present invention. Here, the electrodes are connected in parallel, and therefore, a single power source can decontaminate two or more drums in a uniform manner.

As described above, the present invention is based on the principle that if an electric field is established on the soil, then water and the contaminants are moved. The major reaction mechanisms are electromigration, electroosmosis, and electrophoresis. The electromigration means simply the movements of the charged ions within the solution. The electroosmosis indicates the flow of an ionic liquid under the action of an applied electric field relative to a charged surface. The electrophoresis indicates a phenomenon opposite to the electroosmosis, that is, indicates a phenomenon that charged particles move relative to a fixed solution. The electrophoresis is not very important in the case of compacted soil system. A drag interaction occurs between the solution existing within capillary pores and the charged fluid films contacting with the capillary walls, with the result that the electroosmosis occurs. The thickness of the charged fluid film (or double layer) is known to be 1–10 nm. The film or double layer of the charged fluid is formed for realizing an electrical equilibrium between the fluid and the oppositely charged solid surface. The convective liquid velocity($U_{ea}$) owing to the electroosmosis is proportional to a zeta potential($\zeta$) of the solid surface, and to the electric field strength(E) which is expressed in a negative value for the gradient of the electrical potential. For the thin double layer which is very thin compared with the capillary pore, the convective liquid velocity owing to the electro-osmosis is governed by the Helmholtz-Smoluchowski equation:

$$U_{ea} = \epsilon \zeta E / \mu$$

where $\epsilon$ is the permitivity of the solution, and $\mu$ is the viscosity of the solution.

In the electromigration, the velocity of the ions is proportional to the electric field strength and the number of charges (z), and is governed by the following formula:

$$U_{eu} = vzFE$$

where v is the mobility of the ions, and F is the Faraday constant.

The two phenomena described above have the greatest importance in decontaminating the soil according to the present invention. That is, the substances move along the applied electric field which originates from the electrodes. Therefore, the flow direction can be arbitrarily controlled. The soil has not a uniform distribution, and therefore, the small pores are not touched, but the fluid flows through the large pores. That is, such a path is formed by the washing process of the pressure-driven water.

The electroosmosis is effective for a clay soil or for a material having fine pores. In a soil having a low transmittance, the flow by the electroosmosis is sensitive to the size of the fine pores. However, the electromigration does not depend on the size of the pores, and therefore, it can be applied not only to a soil consisting of fine particles, but also to a soil consisting of coarse particles. Although the movements of the ions caused by the electromigration do not depend on the charges of the soil, the charges of the soil provide the prime motive for the movement of the solution based on the electroosmosis. When a soil contacts with an aqueous solution, the soil becomes charged through the physical/chemical absorptions of the ion species and due to the imperfectness of the soil. However, in all the cases, the surface charges of the soil are greatly influenced by the liquid composition and by the acidity. Silts and clay which are filled with water have negative values of the zeta potential, and the value come within a range of 10 - 100 mV. The electroosmotic convection and the electrophoretic transport of the ionic species are not sufficient for defining the movements of the contaminants. The overall reaction is related to the chemical interaction with the soil, the desorption, the dissolution and the like. Further, the chemical reaction between the electrodes and the bulk solution has to be taken into account. When water is electrolyzed, hydrogen ions are produced at the anode, while hydroxyl ions are generated at the cathode.

Reaction at the anode $$H_2O \rightarrow 2H^+ + \tfrac{1}{2}O_2 + 2e - E^0 + 1.23 \text{ V}$$

Reaction at the cathode $$H_2O + 2e - 2OH^- + H_2 E^0 - 0.83 \text{ V}$$

where $E^0$ is the standard redox potential.

At the electrodes, water is hydrolyzed, and a secondary reaction may occur depending on the chemical species which exist within the aqueous solution. That is, $$2H^+ + 2e - H_2$$

$$Me^{n+} + ne- \rightarrow Me(S)$$

where Me indicates a metal.

At the cathode, the secondary reaction is predominant due to the low electrochemical potential of the electrode, but at the initial stage, the reduction reaction of water is predominant. At the later stages, when the hydrogen ions and the cationic contaminants move toward the cathode, the secondary reaction becomes predominant.

Now the subject matter of the present invention will be described in detail.

A. Installation of electrodes within the drums

1) Installation of anode

A drum 1 is opened, vinyl sack (not illustrated) is lifted, and then an anode 2 is inserted into the drum 1. The vinyl sack is lowered, and a hole is formed so as to form a water flow channel. Then water with an additive (surfactant or complexing agent) added therein is made to flow through the anode tubes by using a peristaltic pump.

2) Installation of cathode

A cathode 3 is buried into the center of the drum 1, and a flexible tube (not illustrated) is inserted into the cathode 3 so as to form a water flow channel. Then the soil is densely pressed. Then some water is injected into the cathode 3.

B. Layout of drums

1) Arrangement of drums

Two or more drums in which the installation of the electrodes is completed are aligned straightly.

2) Connection of power source

All the anodes 2 are connected to an electric wire 4 in parallel, and all the cathodes are connected to another electric wire 4 in parallel. Then the electric wires are connected to a power source 5.

Here, insulating plates such as wood, plastic or rubber have to be disposed between the anodes 2 and the cathodes 3, and between the anodes 2 and the drums 1, so that short circuits would not be formed.

Now the present invention will be described in further details.

A contaminated soils is put into drums, and an anode and a cathode is buried into the soil. Then an electric current is made to flow to decontaminate the soil. The anode includes: (1) at least 3 or more metal tubes made of titanium or zircaloy and having a diameter of 5 cm or less; (2) at least 6 or more metal rods made of stainless steel, titanium, or zircaloy; and (3) stainless steel sieves. The cathode is a tube made of carbon steel, stainless steel, or palladium, and has a diameter of 10 cm or less.

The supplied current density is 0.1–20 A/m². At the initial stage of the decontamination, water is filled into the anode tubes and into the cathode, and then, in order to adjust the acidity of the soil, an inorganic base or inorganic acid solution is injected into the anode tubes and the cathode. Further, an organic complexing agent is injected into the cathode.

The object nuclides to be decontaminated are cesium, strontium and cobalt. The object soil to be decontaminated is the contaminated on-site soil which is contaminated with high radioactive particles at 30 mR/hr or more when measured by the mentioned current density over an area of 3 m².

At the initial stage of the decontamination, a peristaltic pump is used to make the soil filled with water to the saturation state. During the decontamination, in order to adjust the acidity of the soil, a peristaltic pump is used to inject an inorganic base or inorganic acid solution into the anode and the cathode. In the case where the soil is contaminated with a radioactive nuclide, an organic complexing agent solution of less than 0.01 M is injected into the cathode.

The anode is formed by welding a plurality of metal rods to a plurality of metal tubes, thereby forming a polygonal or cylindrical contour. Between the upper and lower metal rods, there is fixed a stainless steel sieve. The metal tubes are filled with sponge or carbon fiber. and the cathode is also filled with a sponge or carbon fiber. Further, insulating plates are disposed between the anode and the drum, and between the cathode and the drum, so that short circuits would not occur.

Each of the metal tubes of the anode has 3 or more holes having a diameter of 0.5 cm or less, and the holes face toward the cathode. The cathode tube has 9 or more holes having a diameter of 0.5 cm or less, and the holes face toward the anode tubes. The distance between the anode and the cathode is 10–80 cm, and the electrodes of the respective drums are connected in parallel, so that two or more drums can be simultaneously decontaminated.

According to the present invention as described above, the following effects can be reaped.

<Evaluation of the decontaminating performance for radioactive nuclide>

1) Contaminating the soil

In order to carry out the experiments at stern conditions, there is used a kaolin clay soil. Then the soil is contaminated by injecting 100 mL of a solution containing 0.01 N of ions of cesium, strontium or cobalt.

2) Fluid to be injected

When decontaminating the radioactive nuclide of cobalt which forms a hydroxide, there can be directly injected the distilled water, and a complexing agent is added into the distilled water. When decontaminating cesium or strontium which does not form a hydroxide, there can be directly used the distilled water. During the decontamination, the acidity of the soil is adjusted by adding an acid or a base.

3) Evaluation of the decontaminating performance

The fluid which has been recovered from the cathode is filtered by using a filtering paper having a pore diameter of 0.2 µm. The metal ion concentration of the solution is analyzed by using an atomic absorption spectrometer, thereby evaluating the decontaminating capability. In the case where a completing agent is used, the fluid from the anode is analyzed. When the decontamination was carried out, a decontamination of 95% or more was realized in the case of Cs and Sr, while a decontamination of 90% or more was realized in the case of Co.

What is claimed is:

1. A method for electrokinetically decontaminating a soil contained in a radioactive waste drum by burying an anode and a cathode into said drum and by supplying a dc electric current to said anode and cathode, characterized in that:

said anode includes: (1) at least 3 or more metal tubes made of titanium or zircaloy and having a diameter of 5 cm or less, (2) at least 6 or more metal rods made of stainless steel, titanium, or zircaloy, and (3) stainless steel sieves; and said cathode is a tube made of carbon steel, stainless steel, or palladium, and has a diameter of 10 cm or less.

2. The method as claimed in claim 1, wherein a supplied current density is 0.1–20 A/m².

3. The method as claimed in claim 1, wherein at an initial stage of the decontamination, a peristaltic pump is used to make the soil filled with water to a saturation state, and during the decontamination, in order to adjust an acidity of the soil, a peristaltic pump is used to inject an inorganic base or inorganic acid solution into said anode and said cathode.

4. The method as claimed in claim 1, wherein object nuclides to be decontaminated are cesium, strontium and cobalt.

5. The method as claimed in claim 1, wherein an object soil to be decontaminated is a soil contaminated with high radioactive particles at 30 mR/hr or more when measured by the mentioned current density over an area of 3 $m^2$.

6. The method as claimed in claim 1, wherein at an initial stage of the decontamination, a peristaltic pump is used to make the soil filled with water to a saturation state; during the decontamination, in order to adjust an acidity of the soil to pH 5–10, a peristaltic pump is used to inject an inorganic base or inorganic acid solution into said anode and said cathode; and in a case where the soil is contaminated with a radioactive nuclide, an organic completing agent solution of less than 0.01 M is injected into said cathode.

7. An apparatus for electrokinetically decontaminating a soil contained in a radioactive waste drum by burying an anode and a cathode into said drum and by supplying a dc electric current to said anode and said cathode, comprising:

an anode formed by welding a plurality of metal rods to a plurality of metal tubes, thereby forming a polygonal or cylindrical contour;

stainless steel sieves installed between each upper and lower metal rods;

said metal tubes being filled with sponge or carbon fiber;

said cathode being filled with a sponge or carbon fiber; and insulating plates disposed between said anode and said drum, and between said cathode and said drum, for preventing short circuits.

8. The apparatus as claimed in claim 7, wherein each of said metal tubes of said anode has 3 or more holes having a diameter of 0.5 cm or less, and said holes facing toward said cathode; said cathode tube has 9 or more holes having a diameter of 0.5 cm or less, and said holes facing toward said anode tubes; and said anode and said cathode are separated from each other by a distance of 10–80 cm.

9. The apparatus as claimed in claim 7, wherein electrodes of said drums are connected in parallel, and one or more drums are decontaminated simultaneously.

* * * * *